(12) United States Patent
Wright (10) Patent No.: US 10,773,939 B1
(45) Date of Patent: Sep. 15, 2020

(54) LIFTING APPARATUS WITH A PIVOTING JAW STRUCTURE

(71) Applicant: Justin Wright, Corunna (CA)

(72) Inventor: Justin Wright, Corunna (CA)

( * ) Notice: Subject to any disclaimer, the term of this patent is extended or adjusted under 35 U.S.C. 154(b) by 0 days.

(21) Appl. No.: 16/680,553

(22) Filed: Nov. 12, 2019

(51) Int. Cl.
*B66C 1/42* (2006.01)
*B66F 19/00* (2006.01)

(52) U.S. Cl.
CPC .................................. *B66F 19/00* (2013.01)

(58) Field of Classification Search
CPC . B66C 1/54; B66C 1/226; B66C 1/422; B66F 19/00
USPC ......... 294/15, 16, 81.54, 81.55, 81.6, 67.33, 294/118, 110.1, 119.1
See application file for complete search history.

(56) References Cited

U.S. PATENT DOCUMENTS

| | | | |
|---|---|---|---|
| 389,856 A * | 9/1888 | Sanborn | |
| 572,952 A | 12/1896 | Bird | |
| 834,271 A * | 11/1906 | Dale | |
| 877,389 A | 1/1908 | Werd | |
| 976,652 A * | 11/1910 | Hensley | |
| 1,107,110 A * | 8/1914 | Priem | A22B 5/06 452/189 |
| 1,814,107 A | 7/1931 | Zavatkay | |
| 2,370,528 A * | 2/1945 | Fontaine | B66C 1/447 294/197 |
| 3,020,078 A * | 2/1962 | Ray | B66C 1/62 294/63.1 |
| D206,091 S | 10/1966 | McKenzie | |
| 3,343,861 A * | 9/1967 | Sinicki | B66C 1/62 294/81.2 |
| 3,572,808 A | 3/1971 | Miller | |
| 4,105,240 A * | 8/1978 | Steenson | B66C 1/422 294/106 |
| 4,336,962 A * | 6/1982 | Read | B66C 1/442 294/106 |
| 4,619,475 A * | 10/1986 | Sylvest, II | B66C 1/625 294/90 |
| 4,838,465 A | 6/1989 | Metzger | |
| 5,632,519 A * | 5/1997 | Stock | A47F 5/0892 294/210 |
| 8,317,243 B2 * | 11/2012 | Emond | B66C 1/625 294/103.1 |
| 9,718,649 B2 | 8/2017 | Swope | |
| 2013/0270849 A1 * | 10/2013 | Daniel | B66C 1/54 294/96 |

* cited by examiner

*Primary Examiner* — Paul T Chin
(74) *Attorney, Agent, or Firm* — Kyle A. Fletcher, Esq.

(57) ABSTRACT

The lifting apparatus is a mechanical structure. The lifting apparatus is configured for use in manually lifting a load. The lifting apparatus attaches to the load such that a plurality of individuals are able to simultaneously lift the load. The lifting apparatus comprises a master beam, a grasping structure, and a rigging chain. The grasping structure and the rigging chain attach to the master beam. The plurality of individuals manipulate the lifting apparatus using the master beam. The grasping structure attaches the load to the master beam. The grasping structure adjusts to accommodate the form factor of the load. The rigging chain is a secondary attachment structure that attaches the load to the master beam such that the loading distribution of the load is balanced relative to the master beam such that the lifting apparatus is more easily manipulated by the plurality of individuals.

17 Claims, 4 Drawing Sheets

LIFTING APPARATUS WITH A PIVOTING JAW STRUCTURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of manipulation devices including gripping heads, more specifically, a gripping head with a pivoting jaw structure. (B25J15/0028)

SUMMARY OF INVENTION

The lifting apparatus is a mechanical structure. The lifting apparatus is configured for use in manually lifting a load. The lifting apparatus attaches to the load such that a plurality of individuals are able to simultaneously lift the load. The lifting apparatus comprises a master beam, a grasping structure, and a rigging chain. The grasping structure and the rigging chain attach to the master beam. The plurality of individuals manipulate the lifting apparatus using the master beam. The grasping structure attaches the load to the master beam. The grasping structure adjusts to accommodate the form factor of the load. The rigging chain is a secondary attachment structure that attaches the load to the master beam such that the loading distribution of the load is balanced relative to the master beam such that the lifting apparatus is more easily manipulated by the plurality of individuals.

These together with additional objects, features and advantages of the lifting apparatus will be readily apparent to those of ordinary skill in the art upon reading the following detailed description of the presently preferred, but nonetheless illustrative, embodiments when taken in conjunction with the accompanying drawings.

In this respect, before explaining the current embodiments of the lifting apparatus in detail, it is to be understood that the lifting apparatus is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lifting apparatus.

It is therefore important that the claims be regarded as including such equivalent construction insofar as they do not depart from the spirit and scope of the lifting apparatus. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
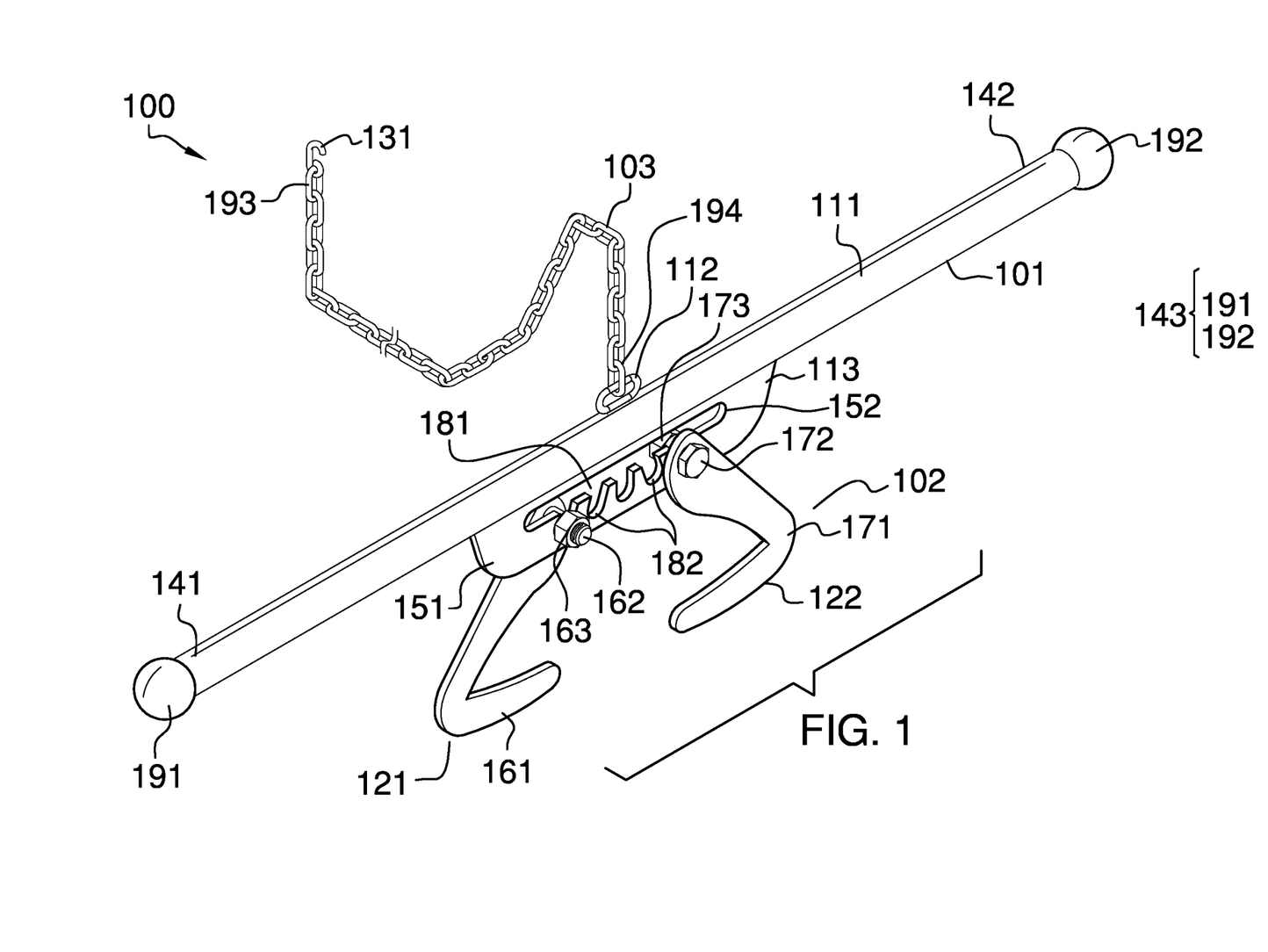
FIG. 1 is a perspective view of an embodiment of the disclosure.
Figure 2:
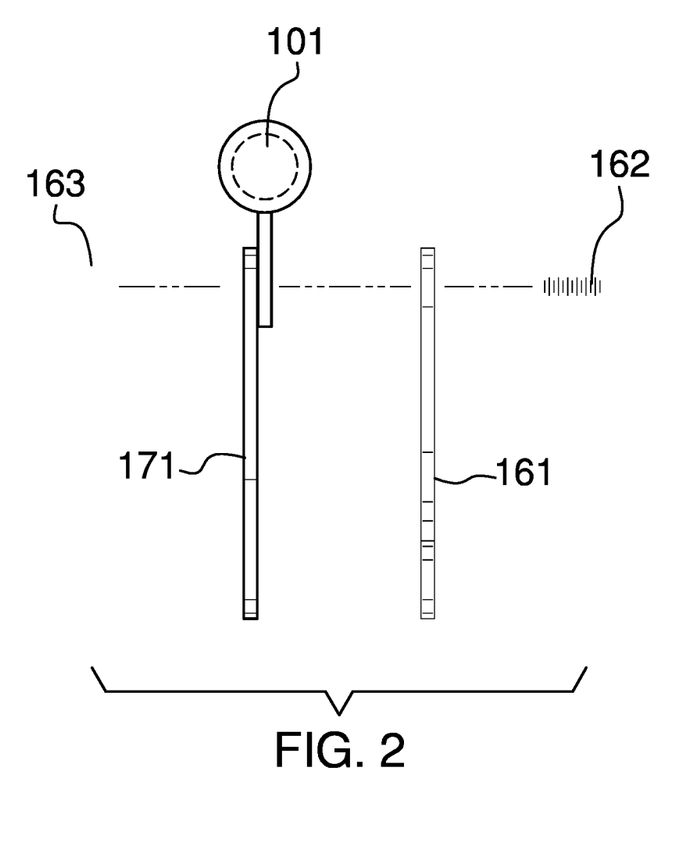
FIG. 2 is a side view of an embodiment of the disclosure.
Figure 3:
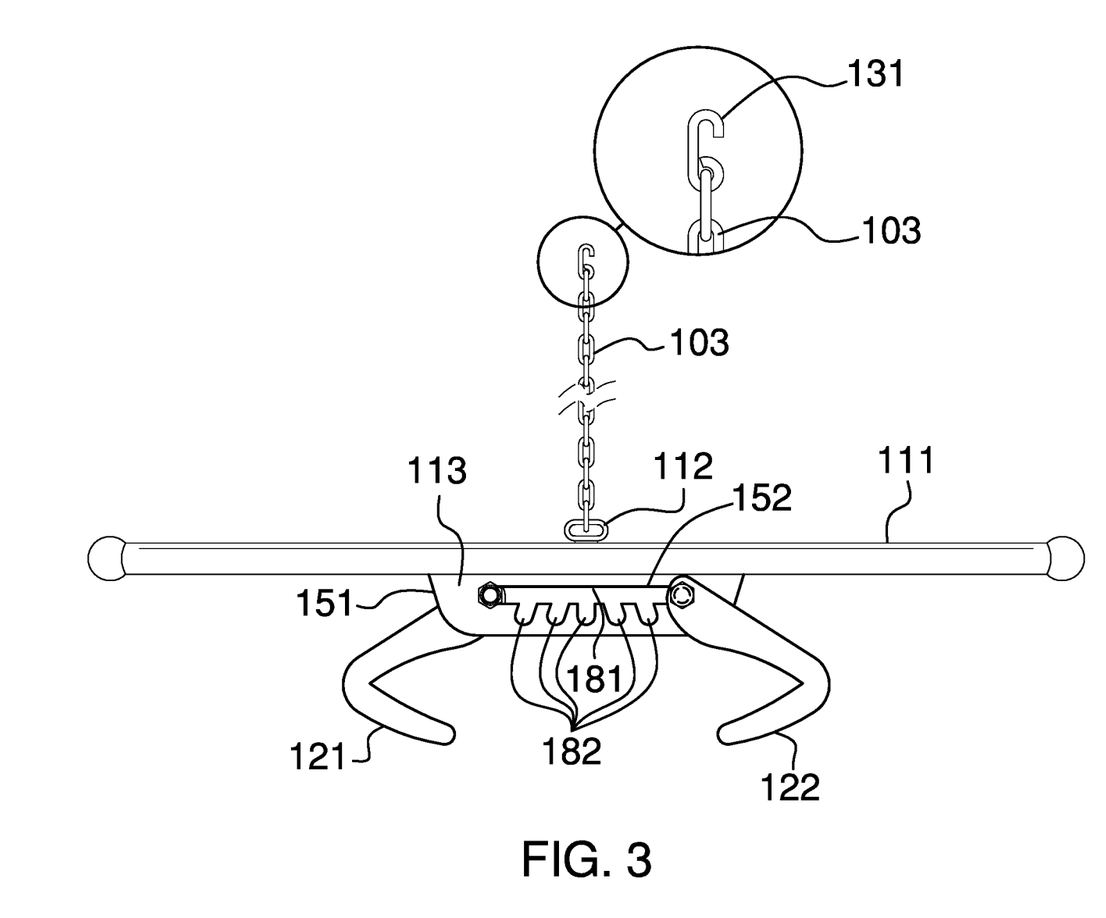
FIG. 3 is a front view of an embodiment of the disclosure.
Figure 4:
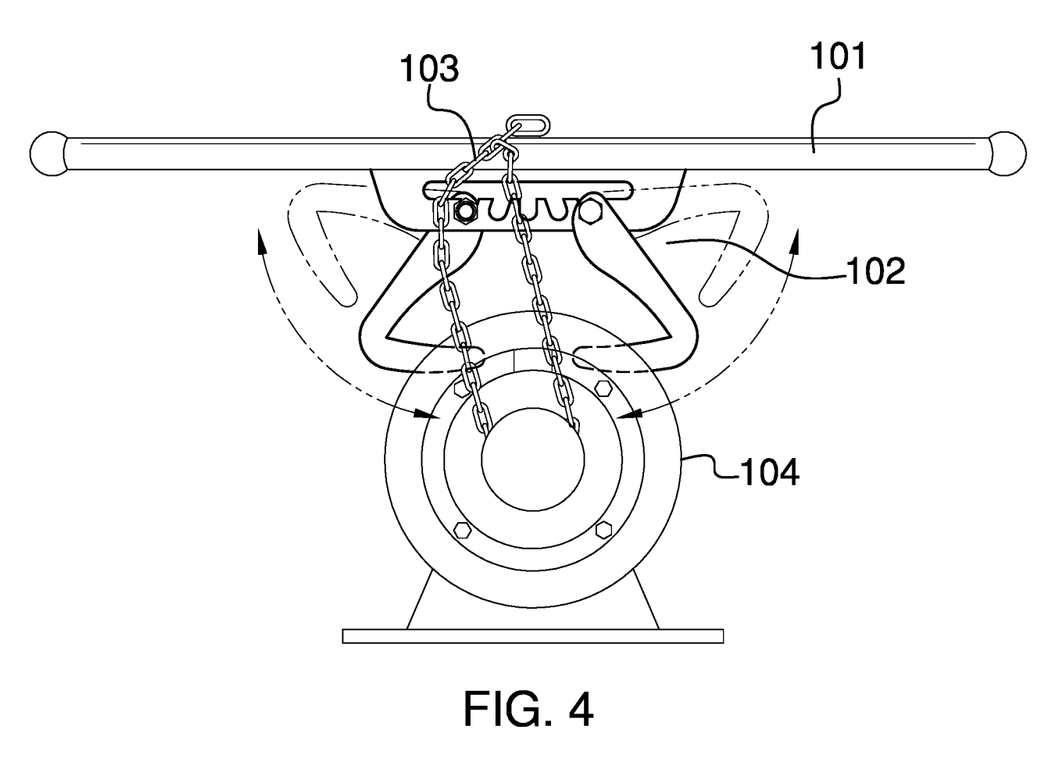
FIG. 4 is an in-use view of an embodiment of the disclosure.

Detailed reference will now be made to one or more potential embodiments of the disclosure, which are illustrated in FIGS. 1 through 4.

The lifting apparatus 100 (hereinafter invention) is a mechanical structure. The invention 100 is configured for use in manually lifting a load 104. The invention 100 attaches to the load 104 such that a plurality of individuals are able to simultaneously lift the load 104. The load 104 is defined elsewhere in this disclosure.

The invention 100 comprises a master beam 101, a grasping structure 102, and a rigging chain 103. The grasping structure 102 and the rigging chain 103 attach to the master beam 101. The plurality of individuals manipulate the invention 100 using the master beam 101. The grasping structure 102 attaches the load 104 to the master beam 101. The grasping structure 102 adjusts to accommodate the form factor of the load 104. The rigging chain 103 is a secondary attachment structure that attaches the load 104 to the master beam 101 such that the loading distribution of the load 104 is balanced relative to the master beam 101 such that the invention 100 is more easily manipulated by the plurality of individuals.

The master beam 101 is a prism-shaped structure. The master beam 101 is a load-bearing structure. The master beam 101 forms a handle structure that allows the invention 100 to be lifted by a plurality of individuals. The master beam 101 comprises a beam shaft 111, an anchor ring 112, and an anchor plate 113. The grasping structure 102 and the rigging chain 103 attach directly to the master beam 101. The master beam 101 suspends the load 104 above a supporting surface when the invention 100 is in use. The master beam 101 forms the portion of the load path that transfers the weight of the load 104 to the plurality of individuals.

The beam shaft 111 is a prism-shaped structure. The beam shaft 111 forms the load 104 bearing structure of the master beam 101. The beam shaft 111 is the structure of the master beam 101 that is lifted by the plurality of individuals. The beam shaft 111 further comprises a first congruent end 141, a second congruent end 142, and a plurality of end caps 143.

The first congruent end 141 is a congruent end of the prism structure of the beam shaft 111. The second congruent end 142 is a congruent end of the prism structure of the beam shaft 111. The second congruent end 142 is the congruent end of the beam shaft 111 that is distal from the first congruent end 141.

Each of the plurality of end caps 143 is a sacrificial structure. Each of the plurality of end caps 143 is an elastomeric structure. Each of the plurality of end caps 143 forms a cap that fits over a congruent end selected from the group consisting of the first congruent end 141 and the second congruent end 142. The plurality of end caps 143 prevent the covered congruent ends of the beam shaft 111 from causing impact damage to an object. The plurality of end caps 143 further comprises a first end cap 191 and a second end cap 192.

The first end cap 191 is an elastomeric structure. The first end cap 191 is the end cap selected from the plurality of end caps 143 that encloses the first congruent end 141 of the beam shaft 111. The second end cap 192 is an elastomeric structure. The second end cap 192 is the end cap selected from the plurality of end caps 143 that encloses the second congruent end 142 of the beam shaft 111.

The anchor ring 112 is a ring structure. The anchor ring 112 attaches to the lateral face of the prism structure of the beam shaft 111. The anchor ring 112 forms an anchor point to which the rigging chain 103 attaches such that the weight of the load 104 is transferred to the beam shaft 111.

The anchor plate 113 is a disk-shaped structure. The anchor plate 113 attaches to the lateral face of the prism structure of the beam shaft 111. The position of the center of the anchor plate 113 is diametrically opposed to the center of the anchor ring 112. A hypothetical line that is formed from the center of the anchor ring 112 to the center of the anchor plate 113 passes through the center of the beam shaft 111. The grasping structure 102 attaches directly to the anchor plate 113. The anchor plate 113 further comprises an anchor disk 151 and a mounting aperture 152.

The anchor disk 151 is a disk-shaped structure. The anchor disk 151 forms the primary shape of the anchor plate 113. A lateral face of the disk structure of the anchor disk 151 attaches to the lateral face of the prism structure of the beam shaft 111. The grasping structure 102 attaches to the anchor disk 151.

The mounting aperture 152 is a negative space that is formed through the congruent ends of the disk structure of the anchor disk 151. The negative space that forms the mounting aperture 152 has an irregular prism shape. The form factor of the mounting aperture 152 forms a plurality of anchor points to which the grasping structure 102 attaches. The mounting aperture 152 further comprises an oval structure 181 and a plurality of c-channels 182.

The oval structure 181 is a negative space that is formed through the congruent ends of the disk structure of the anchor disk 151. Each of the plurality of c-channels 182 is a c-channel that is formed in the perimeter of the oval structure 181. Each of the plurality of c-channels 182 forms a c-channel sized to receive a bolt selected from the group consisting of the first bolt 162 and the second bolt 172. Each of the plurality of c-channels 182 forms an anchor point which allows the selected bolt and its associated nut to attach the hook arm associated with the selected bolt to the anchor disk 151. The position of the center of the selected hook arm relative to the center of the anchor plate 113 is further adjusted by changing the c-channel selected from the plurality of c-channels 182 that is used for attachment.

The grasping structure 102 is a mechanical structure. The grasping structure 102 attaches the load 104 directly to the master beam 101. The grasping structure 102 hooks directly to the load 104. The grasping structure 102 is an adjustable structure such that the grasp of the grasping structure 102 can be adjusted to match the form factor of the load 104. The grasping structure 102 comprises a first hook structure 121 and a second hook structure 122.

The first hook structure 121 is a disk-shaped structure. The first hook structure 121 is an irregularly shaped prism structure. The first hook structure 121 attaches directly to the anchor plate 113. The first hook structure 121 hooks the grasping structure 102 directly to the load 104. The first hook structure 121 rotates such that the position of the center of the first hook structure 121 adjusts relative to the center of the anchor plate 113. The first hook structure 121 comprises a first hook arm 161, a first bolt 162, and a first nut 163.

The first hook arm 161 is a disk-shaped structure. The first hook arm 161 has an irregular prism-shaped. The first hook arm 161 is formed with a curved perimeter. The curved perimeter of the first hook arm 161 forms a structure that hooks onto the load 104. The first hook arm 161 is further formed with a bolt hole. The bolt hole is an aperture that is sized to receive the first bolt 162.

The first bolt 162 is a cylindrical structure that is further formed with an exterior screw thread. The bolt is a hardware item that is defined elsewhere in this disclosure. The first nut 163 is a disk-shaped mechanical structure formed with an interior screw thread. The nut is a hardware item that that is defined elsewhere in this disclosure. The first bolt 162 screws into the first nut 163 to form a threaded connection.

The first bolt 162 and the first nut 163 attach the first hook arm 161 to the anchor disk 151. The first bolt 162 inserts through the bolt hole of the first hook arm 161 such that the first hook arm 161 will rotate around the first bolt 162. The position of the center of the first hook arm 161 relative to the anchor plate 113 adjusts by rotating the first hook arm 161 around the first bolt 162. The first bolt 162 and the first nut 163 lock the first hook arm 161 into a fixed position relative to the anchor disk 151 as the first bolt 162 and the first nut 163 tighten the first hook arm 161 to the anchor disk 151.

The second hook structure 122 is a disk-shaped structure. The second hook structure 122 is an irregularly shaped prism structure. The second hook structure 122 attaches directly to the anchor plate 113. The second hook structure 122 hooks the grasping structure 102 directly to the load 104. The second hook structure 122 rotates such that the position of the center of the second hook structure 122 adjusts relative to the center of the anchor plate 113. The second hook structure 122 comprises a second hook arm 171, a second bolt 172, and a second nut 173.

The second hook arm 171 is a disk-shaped structure. The second hook arm 171 has an irregular prism-shaped. The second hook arm 171 is formed with a curved perimeter. The curved perimeter of the second hook arm 171 forms a structure that hooks onto the load 104. The second hook arm 171 is further formed with a bolt hole. The bolt hole is an aperture that is sized to receive the second bolt 172.

The second bolt 172 is a cylindrical structure that is further formed with an exterior screw thread. The bolt is a hardware item that is defined elsewhere in this disclosure.

The second nut 173 is a disk-shaped mechanical structure formed with an interior screw thread. The nut is a hardware item that that is defined elsewhere in this disclosure. The second bolt 172 screws into the second nut 173 to form a threaded connection.

The second bolt 172 and the second nut 173 attach the second hook arm 171 to the anchor disk 151. The second bolt 172 inserts through the bolt hole of the second hook arm 171 such that the second hook arm 171 will rotate around the second bolt 172. The position of the center of the second hook arm 171 relative to the anchor plate 113 adjusts by rotating the second hook arm 171 around the second bolt 172. The second bolt 172 and the second nut 173 lock the second hook arm 171 into a fixed position relative to the anchor disk 151 as the second bolt 172 and the second nut 173 tighten the second hook arm 171 to the anchor disk 151.

The rigging chain 103 is a load bearing chain. The chain is defined elsewhere in this disclosure. The rigging chain 103 has a tensile strength. The rigging chain 103 does not have a compressive strength. The rigging chain 103 binds the load 104 to the master beam 101. The binding of the rigging chain 103 to the load 104 is rigged such that the position of the center of mass of the load 104 is fixed relative to the center point of the master beam 101. The rigging chain 103 further comprises a rigging hook 131. The rigging hook 131 further comprises a distal chain end 193 and a proximal chain end 194. The distal chain end 193 is the end of the rigging chain 103 that is distal from the proximal chain end 194. The proximal chain end 194 is the end of the rigging chain 103 that attaches to the anchor ring 112 of the master beam 101.

The rigging hook 131 is an S-hook. The rigging hook 131 attaches to the distal chain end 193 of the rigging chain 103. The rigging hook 131 secures the distal chain end 193 of the rigging chain 103 to a link in the rigging chain 103 after the rigging chain 103 is bound to the load 104.

The following definitions were used in this disclosure:

Beam: As used in this disclosure, a beam is a horizontally oriented load bearing structure.

Bind: As used in this disclosure, to bind is a verb that means to tie or secure a first object to a second object using a strap, cord or webbing.

Bolt: As used in this disclosure, a bolt is a cylindrical shaft that is formed with an exterior screw thread. A bolt is defined with an outer diameter.

Bolt Hole: As used in this disclosure, a bolt hole is a prism-shaped disk that is formed with a cylindrical negative space that allows a shaft to be inserted through the faces of the disk. A bolt hole is further defined with an inner diameter.

C-Channel: As used in this disclosure, the C-channel is a structure that is formed in a U-shape. The C-channel forms a prism shape with a hollow interior and an open face that forms a shape characteristic of the letter C. The open space of the C-channel is often used as a track.

Cap: As used in this disclosure, a cap is a sacrificial structure that protects the free end of a cantilever structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Mass: As used in this disclosure, the center of mass refers to a point within a structure wherein a force applied to the point will cause the structure to move without rotation. The center of mass is commonly, but not always, the first moment of the structure normalized by the mass of the structure. While there are technical differences, the center of gravity of an object can be considered a synonym for the center of mass when the object is contained within the atmosphere of the earth.

Chain: As used in this disclosure, a chain is a series of interlinked rings that form a cord-like structure. Like a cord, a chain has tensile strength but is too flexible to provide compressive strength and is not suitable for use in pushing objects. The rings to form a chain are often formed from a metal.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Exterior Screw Thread: An exterior screw thread is a ridge wrapped around the outer surface of a tube in the form of a helical structure that is used to convert rotational movement into linear movement.

Force of Gravity: As used in this disclosure, the force of gravity refers to a vector that indicates the direction of the pull of gravity on an object at or near the surface of the earth.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hang: As used in this disclosure, to hang an object is to suspend an object above a surface from above such that the inferior end of the object does not form a significant portion of the load path of the object.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior Screw Thread: An interior screw thread is a groove that is formed around the inner surface of a tube in the form of a helical structure that is used to convert rotational movement into linear movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Non-Euclidean Prism: As used in this disclosure, a non-Euclidean prism is a prism structure wherein the center axis of the prism lies on a non-Euclidean plane or is otherwise formed with a curvature.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: a) is of uniform thickness; and b) that appears thin relative to the other dimensions of the object. Plates are often disks. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Relaxed Shape: As used in this disclosure, a structure is considered to be in its relaxed state when no shear, strain, or torsional forces are being applied to the structure.

Ring: As used in this disclosure, a ring is term that is used to describe a disk-like structure through which an aperture is formed. Rings are often considered loops.

S-Hook: As used in this disclosure, the S-hook is a non-Euclidean prism structure that has the shape of the letter S. The S-hook is a fastening device that attaches a first object to a second object. Specifically, the S-hook hangs from the first object such that the second object may be suspended from the first object. The S-hook is a well-known and commercially available structure.

Sacrificial Structure: As used in this disclosure, a sacrificial structure is a first object or structure that protects a second object or structure from damage. More specifically, the sacrificial structure protects the second object or structure by being damaged instead of the second object or structure.

Superior: As used in this disclosure, the term superior refers to a directional reference that is parallel to and in the opposite direction of the force of gravity when an object is positioned or used normally.

Suspend: As used in this disclosure, to suspend an object means to support an object such that the inferior end of the object does not form a significant portion of the load path of the object.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A lifting apparatus comprising
wherein the lifting apparatus comprises a master beam, a grasping structure, and a rigging chain;
wherein the grasping structure and the rigging chain attach to the master beam;
wherein the lifting apparatus is a mechanical structure;
wherein the lifting apparatus is configured for use in manually lifting a load;
wherein the lifting apparatus attaches to the load;
wherein the lifting apparatus is manipulated using the master beam;
wherein the grasping structure attaches the load to the master beam;
wherein the grasping structure adjusts to accommodate the form factor of the load;
wherein the rigging chain is a secondary attachment structure that attaches the load to the master beam;
wherein the master beam comprises a beam shaft, an anchor ring, and an anchor plate;
wherein the anchor ring attaches to the beam shaft;
wherein the anchor plate attaches to the beam shaft;
wherein the anchor plate further comprises an anchor disk and a mounting aperture;
wherein the anchor disk is a disk-shaped structure;
wherein the anchor disk forms the primary shape of the anchor plate;
wherein a lateral face of the disk structure of the anchor disk attaches to the lateral face of the prism structure of the beam shaft;
wherein the mounting aperture is a negative space that is formed through the congruent ends of the disk structure of the anchor disk;
wherein the negative space that forms the mounting aperture has an irregular prism shape;
wherein the form factor of the mounting aperture forms a plurality of anchor points to which the grasping structure attaches.

2. The lifting apparatus according to claim 1
wherein the master beam is a load-bearing structure;
wherein the master beam forms a handle structure.

3. The lifting apparatus according to claim 2
wherein the grasping structure is a mechanical structure;
wherein the grasping structure attaches the load directly to the master beam;
wherein the grasping structure hooks directly to the load.

4. The lifting apparatus according to claim 3 wherein the grasping structure is an adjustable structure such that the grasp of the grasping structure adjusts to match the form factor of the load.

5. The lifting apparatus according to claim 4
wherein the rigging chain is a load bearing chain;
wherein the rigging chain has a tensile strength;
wherein the rigging chain does not have a compressive strength;
wherein the rigging chain binds the load to the master beam;
wherein the binding of the rigging chain to the load is rigged such that the position of the center of mass of the load is fixed relative to the center point of the master beam.

6. The lifting apparatus according to claim 5
wherein the grasping structure comprises a first hook structure and a second hook structure;
wherein the first hook structure attaches to the anchor plate;
wherein the second hook structure attaches to the anchor plate.

7. The lifting apparatus according to claim 6
wherein the rigging chain further comprises a rigging hook;
wherein the rigging hook secures the rigging chain to itself after the rigging chain is bound to the load.

8. The lifting apparatus according to claim 7
wherein the beam shaft forms the load bearing structure of the master beam;
wherein the beam shaft further comprises a first congruent end, a second congruent end, and a plurality of end caps;

wherein the first congruent end is a congruent end of the prism structure of the beam shaft;
wherein the second congruent end is a congruent end of the prism structure of the beam shaft;
wherein the second congruent end is the congruent end of the beam shaft that is distal from the first congruent end.

9. The lifting apparatus according to claim 8
wherein the anchor ring is a ring structure;
wherein the anchor ring attaches to the lateral face of the prism structure of the beam shaft;
wherein the anchor ring forms an anchor point to which the rigging chain attaches such that the weight of the load is transferred to the beam shaft.

10. The lifting apparatus according to claim 9
wherein the anchor plate is a disk-shaped structure;
wherein the anchor plate attaches to the lateral face of the prism structure of the beam shaft;
wherein the position of the center of the anchor plate is diametrically opposed to the center of the anchor ring;
wherein a hypothetical line that is formed from the center of the anchor ring to the center of the anchor plate passes through the center of the beam shaft;
wherein the grasping structure attaches directly to the anchor plate.

11. The lifting apparatus according to claim 10
wherein each of the plurality of end caps is a sacrificial structure;
wherein each of the plurality of end caps is an elastomeric structure;
wherein each of the plurality of end caps forms a cap that fits over a congruent end selected from the group consisting of the prism structure of the first congruent end and the second congruent end.

12. The lifting apparatus according to claim 11
wherein the plurality of end caps further comprises a first end cap and a second end cap;
wherein the first end cap is an elastomeric structure;
wherein the first end cap is the end cap selected from the plurality of end caps that encloses the first congruent end of the beam shaft;
wherein the second end cap is an elastomeric structure;
wherein the second end cap is the end cap selected from the plurality of end caps that encloses the second congruent end of the beam shaft.

13. The lifting apparatus according to claim 12
wherein the first hook structure is a disk-shaped structure; or
wherein the first hook structure is an irregularly shaped prism structure;
wherein the first hook structure attaches directly to the anchor plate;
wherein the first hook structure hooks the grasping structure directly to the load;
wherein the first hook structure rotates such that the position of the center of the first hook structure adjusts relative to the center of the anchor plate;
wherein the second hook structure is a disk-shaped structure; or
wherein the second hook structure is an irregularly shaped prism structure;
wherein the second hook structure attaches directly to the anchor plate;
wherein the second hook structure hooks the grasping structure directly to the load;
wherein the second hook structure rotates such that the position of the center of the second hook structure adjusts relative to the center of the anchor plate.

14. The lifting apparatus according to claim 13
wherein the first hook structure comprises a first hook arm, a first bolt, and a first nut;
wherein the first hook arm is a disk-shaped structure; or
wherein the first hook arm has an irregular prism-shaped;
wherein the first hook arm is formed with a curved perimeter;
wherein the curved perimeter of the first hook arm forms a structure that hooks onto the load;
wherein the first hook arm is further formed with a bolt hole;
wherein the bolt hole is an aperture that is sized to receive the first bolt;
wherein the first bolt is a cylindrical structure that is further formed with an exterior screw thread;
wherein the first nut is a disk-shaped mechanical structure formed with an interior screw thread;
wherein the first bolt screws into the first nut to form a threaded connection;
wherein the first bolt and the first nut attach the first hook arm to the anchor disk;
wherein the second hook structure comprises a second hook arm, a second bolt, and a second nut;
wherein the second hook arm is a disk-shaped structure; or
wherein the second hook arm has an irregular prism-shaped;
wherein the second hook arm is formed with a curved perimeter;
wherein the curved perimeter of the second hook arm forms a structure that hooks onto the load;
wherein the second hook arm is further formed with a bolt hole;
wherein the bolt hole is an aperture that is sized to receive the second bolt;
wherein the second bolt is a cylindrical structure that is further formed with an exterior screw thread;
wherein the second nut is a disk-shaped mechanical structure formed with an interior screw thread;
wherein the second bolt screws into the second nut to form a threaded connection;
wherein the second bolt and the second nut attach the second hook arm to the anchor disk.

15. The lifting apparatus according to claim 14
wherein the first bolt inserts through the bolt hole of the first hook arm such that the first hook arm will rotate around the first bolt;
wherein the position of the center of the first hook arm relative to the anchor plate adjusts by rotating the first hook arm around the first bolt;
wherein the first bolt and the first nut lock the first hook arm into a fixed position relative to the anchor disk as the first bolt and the first nut tighten the first hook arm to the anchor disk;
wherein the second bolt inserts through the bolt hole of the second hook arm such that the second hook arm will rotate around the second bolt;
wherein the position of the center of the second hook arm relative to the anchor plate adjusts by rotating the second hook arm around the second bolt;
wherein the second bolt and the second nut lock the second hook arm into a fixed position relative to the anchor disk as the second bolt and the second nut tighten the second hook arm to the anchor disk.

16. The lifting apparatus according to claim 15
wherein the mounting aperture further comprises an oval structure and a plurality of c-channels;
wherein the oval structure is a negative space that is formed through the congruent ends of the disk structure of the anchor disk;
wherein each of the plurality of c-channels is a c-channel that is formed in the perimeter of the oval structure;
wherein each of the plurality of c-channels forms a c-channel sized to receive a bolt selected from the group consisting of the first bolt and the second bolt;
wherein each of the plurality of c-channels forms an anchor point which allows the selected bolt and its associated nut to attach the hook arm associated with the selected bolt to the anchor disk;
wherein the position of the center of the selected hook arm relative to the center of the anchor plate is further adjusted by changing the c-channel selected from the plurality of c-channels that is used for attachment.

17. The lifting apparatus according to claim 16
wherein the rigging hook further comprises a distal chain end and a proximal chain end;
wherein the distal chain end is the end of the rigging chain that is distal from the proximal chain end;
wherein the proximal chain end is the end of the rigging chain that attaches to the anchor ring of the master beam;
wherein the rigging hook is an s-hook;
wherein the rigging hook attaches to the distal chain end of the rigging chain;
wherein the rigging hook secures the distal chain end of the rigging chain to a link in the rigging chain after the rigging chain is bound to the load.

\* \* \* \* \*